Oct. 14, 1969 C. E. P. V. VAN DEN BERG ET AL 3,472,823
COPOLYMERIZATION OF ALPHA-OLEFINS AND DIENES BY ZIEGLER-NATTA TYPE CATALYSTS FORMED IN THE PRESENCE OF UNSATURATED POLYMERS
Filed June 1, 1965
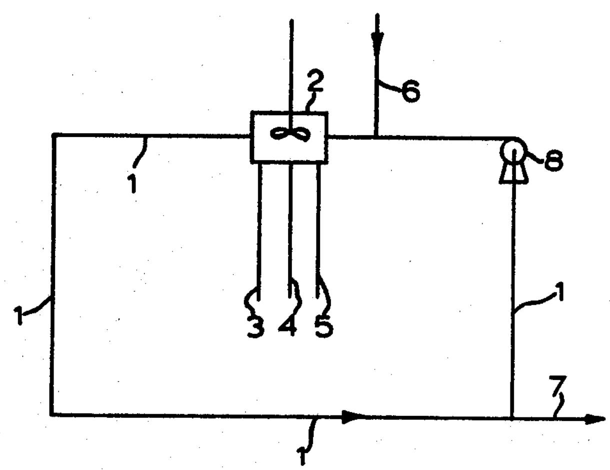
Inventors
Cornelis E. P. V. van den Berg
Roelof Fidder
By [illegible]
Attorney United States Patent Office 3,472,823
Patented Oct. 14, 1969

3,472,823

COPOLYMERIZATION OF ALPHA-OLEFINS AND DIENES BY ZIEGLER-NATTA TYPE CATALYSTS FORMED IN THE PRESENCE OF UNSATURATED POLYMERS

Cornelis E. P. V. van den Berg, Geleen, and Roelof Fidder, Heerlen, Netherlands, assignors to Stamicarbon N.V., Heerlen, Netherlands Filed June 1, 1965, Ser. No. 460.043
Claims priority, application Netherlands, June 2, 1964, 6406167
Int. Cl. C08f *1/08, 1/32*
U.S. Cl. 260—80.78 22 Claims

ABSTRACT OF THE DISCLOSURE

A process of preparing unsaturated copolymers from 1-alkenes and hydrocarbons having more than one double bond by the utilization of coordination catalysts is described wherein the catalyst component is mixed with an unsaturated copolymer thereby reducing the energy required to stir the reaction mixture, obviating the formation of a catalyst activity reducing precipitate, increasing the yield of polymer formed, reducing the amount of polymer sticking to the reaction vessel, and increasing the speed of polymerization. If the copolymer formed is unsaturated, it is preferred to recirculate a portion of this unsaturated copolymer as the initial copolymer to be mixed with the catalyst. The amount of unsaturated copolymer used is that amount sufficient so that no precipitate is formed, and the preferred amount is 20–200 mg. per mmol of the organo-metallic catalyst component.

The present invention relates to a process for preparing unsaturated copolymers, in which a mixture of at least one alkene-1 with the general formula R—CH=$CH_2$, where R represents a hydrogen atom, an alkyl, aryl, aralkyl, or alkaryl group, or a cyclo-alkene, and at least one hydrocarbon with more than one double bond is polymerized in the liquid phase with the aid of a co-ordination catalyst containing an organometallic compound of a metal of the Groups I to III or of Group IV–B and a compound of a heavy metal of the Groups IV–A–VII–A or of Group VIII of the Periodic System of the Elements according to Mendeleef.

It is common knowledge that, like natural rubber, these unsaturated copolymers can be vulcanized with sulphur or with analogous vulcanizing agents. However, the quality of the products thus obtained strongly depends on the conditions under which the polymers have been prepared and in particular on the ratio between the organometallic compound and the heavy-metal compound during the polymerization. Only if this ratio is greater than a given minimum value, usually greater than unity, can copolymers be obtained that are readily vulcanizable so that products with good mechanical properties can be prepared from them.

In a continuous process for the polymerization the catalyst components are usually fed separately to the polymerization reactor and then mixed herein. However, the liquid contained in the reactor is very difficult to stir due to the fact that for economical reasons the polymerization is so carried out that a concentrated suspension or solution of the copolymer is obtained. This makes it very difficult, if not impossible, to mix the catalyst components so rapidly that the ratio between the organometallic compound and the heavy-metal compound is prevented from becoming locally appreciably smaller than is required for preparing a good product. Another drawback of mixing the catalyst components in the reactor is that the reactor becomes very fouled, so that it has to be cleaned repeatedly.

It has also been previously proposed to mix the catalyst components outside the reactor, whether or not in the presence of the monomers to be polymerized. Naturally, this offers the advantage that the mixing can be accomplished in a liquid that can be easily stirred. However, applicant has found that in such a process a precipitate is always formed which reduces the activity of the catalyst and makes it more difficult to remove the catalyst residues from the polymer. Moreover, heavy fouling of the reactor is also observed in this case.

It is an object of the present invention to provide a process by means of which the catalyst components can be mixed outside the reactor without a precipitate being formed. It is a further object of the invention to provide a process in which the catalyst residues can be easily removed from the polymer.

A still further object of the invention is to provide a process by which fouling of the reactor is counteracted. Another object of the invention is to provide a process which gives higher yields than the known processes. Still another object of the invention is to provide a process wherein the residence time of the catalyst and the monomers in the polymerization zone is much smaller than in the known processes. Other objects of the invention will appear hereinafter.

It has now been found that the above objects can be achieved by mixing the catalyst components in the presence of a soluble unsaturated polymer.

The process according to the invention for preparing unsaturated copolymers, wherein a mixture of at least one alkene-1 with the formula R—CH=$CH_2$, where R represents a hydrogen atom, an alkyl, aryl, aralkyl, or alkaryl group, or a cyclo-alkene, and at least one hydrocarbon with more than one double bond is polymerized in the liquid phase with the aid of a co-ordination catalyst containing an organometallic compound of a metal of the Groups I to III or of Group IV–B and a compound of a heavy metal of the Groups IV–A–VII–A or of Group VIII of the Periodic System of the Elements according to Mendeleef, is characterized in that the said catalyst components are mixed with each other in a liquid medium in the presence of such an amount of a soluble unsaturated polymer that no precipitate is formed, and are subsequently passed into the polymerization zone.

The amount of the unsaturated polymer necessary to prevent the formation of a precipitate can be determined by simple experiments. Usually an amount of 20–200 mg. per mmol of the organometallic compound suffices. However, larger amounts may be used without any objection. Although other soluble unsaturated polymers such as polybutadiene and polyisoprene, have the same effect, use is preferably made, of the copolymer formed in the polymerization, when a soluble copolymer is formed. This is simpler from a technical point of view, as a solution of the copolymer is already available in the form of the reaction mixture, so that part of this can be used for mixing the catalyst components. In the mixing use may be made of the solvents that are normally employed in the preparation of the copolymers.

By preference, all or part of the monomers, in the ratio in which they are to be passed into the reaction zone, are also mixed with the catalyst outside the polymerization zone. This ensures that at the moment when the catalyst enters the polymerization zone, it is in contact with a mixture of monomers of the composition that is desired for obtaining a good product. This is of particular importance, because the activity of the catalyst is highest immediately after the catalyst has formed and then rapidly decreases.

The molar ratio in which the organometallic compound and the heavy-metal compound are mixed may vary from 1:1 to 100:1, but preferably ranges between 1:1 and 20:1. The concentration of the organometallic compound in the mixture usually ranges between 1 and 100 mmoles per litre of solvent, but higher concentrations may also be used. The temperature at which the catalyst components are mixed with each other and, if so desired, with the monomers usually ranges between −100 and +80° C. The mixing is preferably effected at a temperature below 0° C. to prevent the catalyst from losing a large part of its activity, or, if the monomers are mixed with the catalyst outside the reactor, to prevent the polymerization from beginning outside the reactor; and the mixture is passed into the polymerization zone as soon as possible after its preparation, preferably within 15 minutes and, if possible, within 1 minute.

The process according to the invention can in general be used in the preparation of polymers consisting of at least one alkene-1, or a cyclo-alkene, and at least one hydrocarbon with more than one double bond. Suitable alkenes-1 are, e.g., ethylene, propylene, butene-1, pentene-1, 4-methyl pentene-1, hexene-1, dodecene-1, and styrene, and suitable cyclo-alkenes are, e.g., cyclobutene and cyclopentene. Examples of hydrocarbons with more than one double bond are butadiene, isoprene, pentadiene-1,4, hexadiene-1,4, 2-phenyl hexadiene-1,5, octadiene-1,5, monovinyl cyclohexene, trivinyl cyclohexane, cyclopentadiene, dicyclopentadiene, cyclooctadiene, cyclododecatriene, 5-alkenyl 2-norbornenes, and 2-alkyl 2,5-norbornadienes. The process is particularly suitable for preparing copolymers containing ethene and propene and, as a third constituent, a hydrocarbon with nonconjugated double bonds, such as dicyclopentadiene, cyclooctadiene, or hexadiene-1,4.

The polymerization may be carried out in the usual way. The organometallic component of the catalyst is preferably an aluminum compound, such as triethyl aluminum, di-isobutyl aluminum hydride, di-ethyl aluminum chloride, mono-ethyl aluminum dichloride, or ethyl ethoxy aluminum chloride, and the heavy-metal compound is preferably a vanadium compound, such as vanadium tetrachloride, vanadium oxytrichloride, vanadyl bisacetalacetonate, and vanadyl tri-alkoxides. Especially the combination of mono-ethyl aluminum dichloride or of a mixture of monoethylaluminumdichloride and diethylaluminummonochloride and vanadium oxytrichloride are very suitable catalysts. The catalyst components may also be used in combination with Lewis bases, such as ethers, amines, phosphines, arsines, stibines, and the like.

The polymerization may be carried out in a solvent, such as hexane, heptane, benzene, gasoline, kerosene, dichloromethane, ethyl chloride, or 1,2-dichloroethane. It is also possible for one or several of the monomers to be polymerized to serve as solvent, the temperature and the pressure being then so chosen that the monomers are kept in the liquid state. The temperature usually ranges between −100 and +100° C., preferably between −10 and +60° C. The pressure may be 1 atmosphere or higher, but is usually lower than 100 atm.

The process of the present invention is advantageously carried out in a continuous manner, as for instance by dissolving the catalyst components and the monomers to be copolymerized in a suitable inert medium, passing this solution through a polymerization zone at a suitable rate, adding fresh monomers and catalyst components to a part of the solution leaving the polymerization zone and recirculating this part to the polymerization zone.

Mixing of the catalyst components and the monomers with the solution containing the polymer is carried out conveniently in the feed pipe for the polymerization zone, preferably by means of an inline-blender. In this way said mixing can be completed very fast, using a relatively small amount of energy, as compared to mixing in a polymerization reactor or in a separate mixing vessel.

Since the catalyst components are mixed with each other, and preferably also with the monomers, outside the polymerization zone, the catalyst is already very active on entering therein. The applicant has found that as a result thereof the residence time in the polymerization zone can be much shorter than in other processes, wherein said zone is also used for mixing the catalyst components and the monomers. According to the present invention, polymerization times of less than one minute and often of only 10–20 seconds can be used advantageously.

As a further consequence thereof, the size of the polymerization vessel can be greatly reduced, since the vessel need not be stirred, which greatly improves the economy of the process. It is even possible to use no special polymerization vessel at all, and according to a preferred embodiment of the process according to the invention, the polymerization is carried out by simply passing the mixture of the catalyst components and the monomers at the desired temperature through a pipe of suitable length.

It is also an advantage of the process according to the present invention that, in comparison with other processes, the organometallic compound and the heavy-metal compound can be used in relatively low molar ratios without impairing the catalyst activity. Preferably, said compounds are used in a molar ratio between 6:1 and 3:1.

The following examples will serve to elucidate the invention without restricting it.

Example 1

A number of experiments were carried out using a glass three-neck 500 ml. flask provided with a stirrer and a gas-inlet tube and containing 200 ml. of dry hexane, in which, two or more of the following components were dissolved at room temperature: $C_2H_5AlCl_2$, $VOCl_3$, dicyclopentadiene (DCPD), a saturated copolymer consisting of 52% by weight of ethylene and 48% by weight of propylene, an unsaturated copolymer consisting of 51% by weight of ethylene, 45% by weight of propylene, and 4% by weight of DCPD, and a gas mixture consisting of 50% by volume of ethylene and 50% by volume of propylene. These substances were added in such amounts that the final concentrations of $C_2H_5AlCl_2$, $VOCl_3$, and DCPD in the liquid were 10, 2, and 15 mmoles/litre, respectively, and those of the copolymers 2 g./litre, the hexane being virtually saturated with the gas mixture.

The results are compiled in the table below. In this table a plus sign indicated which substances were added in each experiment, the formation or non-formation of a precipitate being shown by a plus sign or a minus sign respectively. The substances were added in the order in which they are mentioned in the table from left to right.

| Experiment | $C_2H_5AlCl_2$ | Ethylene/ propylene gas mixture | Saturated copolymer | Unsaturated copolymer | $VOCl_3$ | DCPD | Precipitate |
|---|---|---|---|---|---|---|---|
| A | + | | | | + | | + |
| B | + | | | | + | + | + |
| C | + | + | | | + | | − |
| D | + | + | | | + | + | + |
| E | + | + | + | | + | + | + |
| F | + | + | | + | + | + | − |
| G | + | | | + | + | + | − |
| H | + | | | + | + | | − |

From experiments A, B, and D it appears that a precipitate always forms if the two catalyst components $C_2H_5AlCl_2$ and $VOCl_3$ are brought together whether or not in the presence of the hydrocarbon with more than one double bond (DCPD). However, if an unsaturated copolymer is also present, no precipitate is formed (experiments F, G and H). Curiously enough the formation of a precipitate cannot be prevented by the addition of a saturated copolymer (experiment E).

Example 2

The experiments of Example 1 were repeated with the difference that, instead of cyclopentadiene, cyclooctadiene was used as a monomer. The results were the same. Here, too, the formation of a precipitate could be prevented only by the presence of an unsaturated polymer.

Example 3

Two series of experiments were carried out in the same way as in Example 1 with the difference that, instead of $C_2H_5AlCl_2$, $(C_2H_5)_2AlCl$ was used in one series and tri-isobutyl aluminum in the other. The results were the same.

Example 4

In the same way as in Example 1 two series of experiments were carried out in which, however, instead of $VOCl_3$, $VCl_4$ was used in one series and $VO(OC_4H_9)_3$ in the other. The results were identical.

Example 5

In a continuous polymerization of a mixture of ethylene, propylene, and dicyclopentadiene, the catalyst components $C_2H_5AlCl_2$ and $VOCl_3$, both dissolved in hexane, were mixed in the supply line to the reactor at a temperature of —20° C. in such a concentration that the catalyst mixture entering the reactor contained 100 mmoles of $C_2H_5AlCl_2$ and 10 mmoles of $VOCl_3$ per litre of hexane. Within 1 minute after being mixed, the mixture was passed into the reactor in which it was diluted with an amount of hexane that was nine times as large and contained 15 mmoles of dicyclopentadiene per litre. Also a gas mixture containing 30% by volume of ethylene and 70% by volume of propylene was passed into the reactor. The polymerization was carried out at a pressure of 1 atm. gauge and a temperature of 30° C. After a mean residence time of about 30 minutes the polymer was discharged continuously. This solution contained 26 g. of the unsaturated ethylene-propylene-dicyclopentadiene copolymer per litre.

The same experiment was repeated except that the catalyst components were mixed with each other in the presence of 2 g. of an unsaturated copolymer consisting of ethylene, propylene, and dicyclopentadiene (52, 44 and 4% by weight, respectively) per litre of hexane. The reaction mixture now contained much more copolymer, viz 33 g./l. Moreover, the reactor was much cleaner after this experiment than in the first case.

Example 6

In a continuous polymerization of a mixture of ethylene, propylene, and dicyclopentadiene two equal flows of heptane containing 5 mmoles of $C_2H_5AlCl_2$ and a mixture of 0.5 mmole of $VOCl_3$ and 30 mmoles of dicyclopentadiene, respectively; per litre were mixed immediately before the polymerization reactor at a temperature of 23° C. and then passed into the reactor, where, at 2 atm. gauge and 30° C., the mixture was brought into contact with a gas mixture consisting of 70% by volume of propylene and 30% by volume of ethylene. The polymerization was continued for 60 hours, during which 1600 g. of polymer formed, 11 g. of which stuck to the reactor wall.

When the unsaturated copolymer of ethylene, propylene, and dicyclopentadiene of Example 5 was added to the solution of $C_2H_5AlCl_2$ in heptane, 1900 g. of polymer formed, only 1 gram of which stuck to the reactor wall.

Example 7

A continuous polymerization of a mixture of ethylene, propylene and dicyclopentadiene was carried out in the apparatus which has been drawn schematically in the figure.

The apparatus comprises a closed circuit, which comprises a pipe 1 having an inner diameter of 50 mm. and a length of 6 m., a circulating pump 8 and an inline-blender 2. The apparatus is further provided with feed pipes 3, 4 and 5, which lead into the inline-blender 2, a feed pipe 6, which leads into pipe 1, and an outlet pipe 7.

Through pipe 6 a mixture of gasoline, ethylene and propylene was continually charged into pipe 1, at a rate of 190 l. of gasoline, 220 moles of ethylene and 830 moles of propylene per hour. Through pipes 3, 4 and 5, respectively, 0.8 mole of aluminumsesquichloride, 0.08 mole of vanadium-oxytrichloride and 6.75 moles of dicyclopentadiene, each dissolved in 3 l. of gasoline, were fed per hour into the inline-blender 2, wherein they were intimately mixed with each other, with the freshly introduced ethylene and propylene and with circulating previously formed polymer. The circulating pump 8 was set to run at such a speed that it gave a throughput of 1000 l. per hour. The average residence time of the reactants in the circuit was about 2.5 minutes. The pressure in the circuit was kept at 10 atm. gauge and the temperature at 25° C. The polymerization reaction started immediately after the reactants had been mixed in the inline-blender and was practically completed within a distance of about 1 m. from the inline-blender, so that the actual polymerization time was about 45 seconds. The polymer solution formed was continuously withdrawn from the circuit through pipe 7. From the solution a terpolymer was obtained in a yield of 8750 g. per hour and having ethylene, propylene and dicyclopentadiene contents of 56, 40 and 4 percent by weight, respectively.

What is claimed is:

1. In a process for preparing unsaturated interpolymers, in which a mixture of at least one alkene-1 with the general formula R—CH═CH₂, wherein R is selected from the group consisting of a hydrogen atom, an alkyl, aryl, aralkyl, and alkaryl group, and/or a cyclo-alkene, and at least one hydrocarbon with more than one double bond is polymerized in the liquid phase with the aid of a coordination catalyst containing an organometallic compound of a metal selected from the metals consisting of the Groups I to III and Group IV–B of the Periodic System and a compound of a heavy metal selected from the metals consisting of the Groups IV–A to VII–A and Group VIII of the Periodic System of the Elements according to Mendeleef, the improvement which comprises mixing the said catalyst components in a liquid medium in the presence of 20 mg. or more of a soluble unsaturated hydrocarbon polymer per mmole of said organometallic compound so that no catalyst precipitate is formed, and subsequently passing the mixture into the polymerization zone.

2. A process according to claim 1, wherein the soluble unsaturated polymer comprises the interpolymer that is formed in the polymerization.

3. A process according to claim 1, wherein said soluble unsaturated polymer is used in an amount of 20–200 mg. per mmole of the organometallic catalyst component.

4. A process according to claim 1, wherein the catalyst contains an organic aluminum compound and a vanadium compound.

5. A process according to claim 2, wherein the catalyst contains an organic aluminum compound and a vanadium compound.

6. A process according to claim 3, wherein the catalyst contains an organic aluminum compound and a vanadium compound.

7. A process according to claim 1, wherein the soluble unsaturated polymer comprises a interpolymer of ethylene, propylene, and a hydrocarbon with two or more non-conjugated double bonds.

8. A process according to claim 3, wherein the soluble unsaturated polymer comprises a interpolymer of ethylene, propylene, and a hydrocarbon with two or more non-conjugated double bonds.

9. A process according to claim 4, wherein the soluble unsaturated polymer comprises a interpolymer of ethylene, propylene, and a hydrocarbon with two or more non-conjugated double bonds.

10. A process according to claim 1, wherein at least part of the monomers, in the ratio in which they are passed into the reaction zone, are also mixed with the catalyst components.

11. A process according to claim 4, wherein at least part of the monomers, in the ratio in which they are passed into the reaction zone, are also mixed with the catalyst components.

12. A process according to claim 9, wherein at least part of the monomers, in the ratio in which they are passed into the reaction zone, are also mixed with the catalyst components.

13. A process for preparing unsaturated interpolymers comprising mixing at least one alkene-1 with the general formula $R—CH=CH_2$ wherein R is selected from the group consisting of a hydrogen atom, an alkyl, aryl, aralkyl and alkaryl group and/or a cyclo-alkene, at least one hydrocarbon with more than one double bond, a solvent, and coordination catalyst components in the presence of an unsaturated hydrocarbon polymer at a temperature below 0° C., and then passing the mixture into a polymerization zone maintained at a copolymerization temperature, said catalyst components comprising an organo-metallic compound of a metal selected from the metals consisting of the Groups I to III and Group IV–B of the Periodic System and a compound of a heavy metal selected from the metals consisting of the Groups IV–A to VII–A and Group VIII of the Periodic System, the amount of said unsaturated polymer added being in an amount of 20–200 mg. per mmole of said organometallic compound.

14. A continuous process in accordance with claim 13 wherein additional of said alkene-1 and hydrocarbon with more than one double bond ingredients are added to a portion of the solution leaving the polymerization zone and recirculating this portion to the polymerization zone.

15. A process according to claim 13 wherein the unsaturated polymer added comprises the interpolymer that is formed in the polymerization.

16. A process for preparing unsaturated interpolymers comprising mixing coordination catalyst components, a solvent, and at least one hydrocarbon with more than one double bond in the presence of an unsaturated hydrocarbon polymer, and then passing the mixture into a polymerization zone into contact with at least one alkene-1 with the general formula $R—CH=CH_2$ wherein R is selected from the group consisting of a hydrogen atom, an alkyl, aryl, aralkyl and alkaryl group and/or a cycloalkene, at a copolymerization temperature, said catalyst components comprising an organometallic compound of a metal selected from the metals consisting of the Groups I to III and Group IV–B of the Periodic System and a compound of a heavy metal selected from the metals consisting of the Groups IV–A to VII–A and Group VIII of the Periodic System, according to Mendeleef, the amount of said unsaturated polymer added being in an amount of 20–200 mg. per mmole of said organometallic compound.

17. A process according to claim 16 wherein the unsaturated polymer added comprises the interpolymer that is formed in the polymerization.

18. A continuous process in accordance with claim 16 wherein additional of the hydrocarbon with more than one double bond is added to a portion of the solution leaving the polymerization zone and recirculating this portion to the polymerization zone.

19. A process for preparing an unsaturated interpolymer of ethylene, propylene and dicyclopentadiene comprising mixing ethylene, propylene, dicyclopentadiene, and coordination catalyst components dissolved in a solvent in the presence of an unsaturated interpolymer of ethylene, propylene and dicyclopentadiene at a temperature below 0° C., and then passing the mixture into a polymerization zone maintained at a copolymerization temperature, said catalyst components comprising an organometallic compound of a metal selected from the metals consisting of the Groups I to III and Group IV–B of the Periodic System and a compound of a heavy metal selected from the metals consisting of the Groups IV–A to VII–A and Group VIII of the Periodic System, according to Mendeleef, the amount of said unsaturated interpolymer added being in an amount of 20–200 mg. per mmole of said organometallic compound.

20. A continuous process in accordance with claim 19 wherein additional ethylene, propylene and dicyclopentadiene are added to a portion of the solution leaving the polymerization zone and recirculating this portion to the polymerization zone.

21. A process for preparing an unsaturated interpolymer of ethylene, propylene and dicyclopentadiene comprising mixing coordination catalyst components, a solvent, and dicyclopentadiene in the presence of an unsaturated interpolymer of ethylene, propylene and dicyclopentadiene, and then passing the mixture into a polymerization zone into contact with a gas mixture of ethylene and propylene at a copolymerization temperature, said catalyst components comprising an organometallic compound of a metal selected from the metals consisting of the Groups I to III and Group IV–B of the Periodic System and a compound of a heavy metal selected from the metals consisting of the Groups IV–A to VII–A and Group VIII of the Periodic System, the amount of said unsaturated interpolymer added being in an amount of 20–200 mg. per mmole of said organometallic compound.

22. A continuous process in accordance with claim 21 wherein additional dicyclopentadiene is added to a portion of the solution leaving the polymerization zone and recirculating this portion to the polymerization zone.

References Cited

UNITED STATES PATENTS 3,341,503 9/1967 Paige ____________ 260—80.78

JOSEPH L. SCHOFER, Primary Examiner

ROGER S. BENJAMIN, Assistant Examiner

U.S. Cl. X.R.

260—88.2